United States Patent [19]

Jung

[11] 3,890,099

[45] June 17, 1975

[54] COLORIMETRIC ASSAY FOR UREA

[76] Inventor: David H. Jung, 3240 Brill Rd., Indianapolis, Ind. 46227

[22] Filed: July 5, 1974

[21] Appl. No.: 486,062

[52] U.S. Cl............ 23/230 B; 23/253 TP; 252/408
[51] Int. Cl. ............................................ G01n 33/16
[58] Field of Search...... 23/230 B, 253 TP; 252/408

[56] References Cited
UNITED STATES PATENTS

| | | | |
|---|---|---|---|
| 3,375,079 | 3/1968 | Lyshkon............................ | 23/232 R |
| 3,446,599 | 5/1969 | Shand ......................... | 23/253 TP X |
| 3,718,432 | 2/1973 | Roth.............................. | 23/230 B X |

OTHER PUBLICATIONS

Chem. Abstracts, Vol. 53, 1959, 21430g, "Determining Microamounts of Isopropyl N-phenylcarbamate".

Primary Examiner—Morris O. Wolk
Assistant Examiner—Arnold Turk
Attorney, Agent, or Firm—Woodard, Weikart, Emhardt & Naughton

[57] ABSTRACT

A process for assaying the urea content of fluids such as blood serum, plasma, urine, and spinal fluid using as reagents ortho-phthalaldehyde and N-(1-naphthyl) ethylene-diamine dihydrochloride. The reaction is very specific for urea, and demonstrates a linear relationship of absorbance and concentration for concentrations of urea nitrogen to 250 mg. per deciliter. In addition, both reagents are stable and the reaction does not require a heating bath.

17 Claims, No Drawings

COLORIMETRIC ASSAY FOR UREA

BACKGROUND OF THE INVENTION

1. Field of the Invention

This invention relates to chemical processes for assaying the urea content of fluids and aqueous solutions.

2. Description of the Prior Art

Urea is the chief end product of protein metabolism in the body. The importance of the urea concentration in the blood lies in its value as an indicator of kidney function. Elevation of the urea concentration in blood signifies inadequate kidney function, and although the urea itself may be harmless, invariably there are toxic substances retained in the blood in rough proportion to the urea level. It is for this reason that a high non-protein nitrogen or blood urea nitrogen level is a matter of grave concern to the physician. However, the urea concentration in blood is influenced by diet, so that many people who are malnourished or who are on low-protein diets may have blood nitrogen levels that are not accurate indicators of kidney function.

The commonest cause of high blood urea values (uremia) is renal disease which may be either acute or chronic. All the inflammatory, degenerative, congenital or neoplastic ills that effect the kidney may cause uremia, and the degree of uremia provides a rough index to the severity of the existing condition.

There are available several methods which are routinely employed for the determination of urea in biological fluids such as serum, plasma or urine. In the most commonly used method urea is hydrolyzed to ammonia carbonate by means of the enzyme urease in the presence of a buffer solution. Ammonia is liberated from the carbonate salt by the addition of sodium hydroxide and then distilled into 0.05 normal hydrochloric acid. The amount of nitrogen present is then determined colorimetrically. This procedure is described in detail in the *Manual of Clinical Laboratory Methods*, fourth edition, by Opal Heffler, publisher, Charles Thomas, Springfield, Illinois.

Other procedures for the detection of urea in various body fluids are well known in clinical chemistry. One such procedure utilizes chemical hydrolysis and requires special apparatus not always available in a routine laboratory. Another procedure employs a direct colorimetric reaction of urea in a protein free filtrate with an organic reagent such as diacetyl monoxime. Still another involves a test which depends on the action of the enzyme urease to convert urea to an ammonium salt which is measured by titration or nesslerization. These prior procedures have the disadvantage that they all require a considerable amount of skill and familiarity with complicated laboratory techniques. In addition, certain of these previous tests have required use of somewhat unstable reagents or the use of high temperatures normally in the range of above 90° C.

Among the methods typical of the prior art determinations is the color reaction with diacetyl monoxime, first described by Fearon, *Biochemistry Journal*, 33, 902 (1939). Various compounds containing ureido-groups generally give a measurable yellow color with diacetyl monoxime. In the method of Fearon, the sample is treated with diacetyl monoxime in acid solution to form a color product. The intensity of color produced can then be measured colorimetrically to give a value which is related to the concentration of urea nitrogen in the sample. The diacetyl monoxime analyses have typically involved two reagents, a first reagent comprising the diacetyl monoxime and a second reagent comprising an aqueous acid and other ingredients. Thiosemicarbazide has been employed to intensify the color and change of hue from yellow to red. Coulombe et al., *Clinical Chemistry*, 9, 102–8 (1963). The reaction has also been further modified by carrying out the diacetyl monoxime urea reaction in weak acid solution containing thiosemicarbazide and ferric ion. Marsh et al., *Clinical Chemistry*, 11, 624–7 (1965).

In general the quantitative testing for urea has long been recognized as an invaluable tool in the analysis of disease. However, previous attempts to measure the blood urea level have suffered from certain disabilities. Among these are the necessity for high temperatures in the range of 90° C., the use of traditionally unstable reagents, the introduction of significant inaccuracies due to false color formation by reagent interaction, inability to run samples quickly, and finally the need for highly specialized equipment and highly trained technicians to operate such equipment.

These and other disadvantages are shown by the prior art methods illustrated by the Lagomarsino, U.S. Pat. No. 3,718,543 (1973); Rush, U.S. Pat. No. 3,511,611 (1970); and Chaney, U.S. Pat. No. 3,119,751 (1964).

SUMMARY OF THE INVENTION

This invention relates to a process for determining the urea content of fluids comprising mixing ortho-phthalaldehyde, a fluid sample and N-(1-naphthyl) ethylenediamine dihydrochloride and then obtaining a colorimetric reading for said mixture after a period of time.

It is an object of this invention to provide a process for determining the urea content of fluids wherein it is not necessary to use excessive reaction temperatures.

It is a further object of this invention to provide a process for determining the urea content of fluids wherein the reagents used are stable.

It is a still further object of this invention to provide a process for determining the urea content of fluids wherein the same process is easily adaptable to both automated and manual systems.

These and other objects of this invention will become apparent from the following description of the preferred embodiment.

DESCRIPTION OF THE PREFERRED EMBODIMENT

For purposes of this application the term "fluids" shall be understood to refer to body fluids such as blood serum, blood plasma, urine, spinal fluid and, in addition, shall refer to aqueous solutions containing urea. Although the most preferred application of the process of this invention is to blood serum, it is to be understood that the same applies to all other fluids as defined herein.

Prior attempts to determine blood urea concentration have generally involved measurement of blood nitrogen which can be converted into urea content instead of a more desirable direct measurement of urea. Measurement of urea indirectly by measurement of blood nitrogen presents accuracy and reproduceability problems due to the almost inevitable presence of ammonia which naturally leads to increased nitrogen indications. The process of this invention involves the direct measurement of the urea content of blood serum and employs as reagents ortho-phthalaldehyde and N-(1-naphthyl) ethylenediamine dihydrochloride. These reagents are commercially available and are advantageous in that they are very stable and when mixed do not interact significantly to cause coloration which is different from that produced by blood interaction.

The first reagent is ortho-phthalaldehyde, a solution of which can be prepared in the following manner. While for the purposes of this application, specific weight and volume measurements are given, it is to be understood that these are not critical and that the reagents may be mixed in other amounts which may be desired. From about 100 mg. to about 700 mg. of ortho-phthalaldehyde and about ¾ ml. of 30 percent polyoxyethylene(23) lauryl ether are dissolved in about 1000 ml. of 0.1 N sulfuric acid. This yields the desirable concentration of the first reagent ortho-phthalaldehyde. The second reagent is N-(1-naphthyl) ethylenediamine dihydrochloride which is prepared in solution by mixing about 5 grams of boric acid with about 600 ml. of water and about 220 ml. of concentrated sulfuric acid. The resulting mixture is cooled to about room temperature and to the resulting cooled mixture is added from about 100 mg. to about 700 mg. of N-(1-naphthyl) ethylenediamine dihydrochloride and about ¾ ml. of 30 percent polyoxyethylene(23) lauryl ether. To this mixture enough water is added to make the final volume about 1 liter. It should be noted that in making both of these reagents the ingredient noted as 30 percent polyoxyethylene(23) lauryl ether is more commonly known by the trademark BRIJ-35 and is a commercial wetting agent which is readily available.

A preliminary step to the use of the process of this invention is obtaining a fluid sample. Fluid samples, such as blood serum, may be obtained from any of the well known and now standard techniques which are fully described in the literature. The fluid sample is mixed with the orthophthalaldehyde reagent. The relative amounts of fluid and ortho-phthalaldehyde is important only to the extent that the degree of color developed can be measured by the particular type of colorimetric instrument being used. For example, the more color that is necessary, as in less sensitive instruments, the more fluid that will be necessary in relation to the reagents.

To the fluid ortho-phthalaldehyde solution is added the second reagent which is N-(1-naphthyl)ethylenediamine dihydrochloride. Upon addition of the N-(1-naphthyl) ethylenediamine dihydrochloride the colorimetric reaction begins. As in most colorimetric reactions, the color develops gradually. Therefore, although it is possible to measure the color development immediately, it would require an extremely sensitive instrument to do so. Although after the mixing of ortho-phthalaldehyde, fluid, and N-(1 naphthyl) ethylenediamine dihydrochloride no heating step is necessary, it is considered preferable that the mixture be heated in an incubator to approximately 37° C. This provides optimal results and can be conveniently accomplished by use of standard laboratory equipment. It has been found preferable to incubate the reactants to allow the reaction to proceed for a predetermined period of time in the order of from about 2 minutes to about 30 minutes and then to measure the color after removal from the incubator. The necessity for this step is, however, determined by the relative sensitivity of the colorimetric instrument.

A blank sample is often used to provide a control to give an absolute colorimetric reading. This blank sample can be prepared either each time a fluid sample is prepared, or once a day to provide a common standard, or each time a new set of reagents is prepared. The actual usage of blank samples is specific to the individual performing the test process. A blank sample is prepared by merely adding the two reagents, ortho-phthalaldehyde and N-(1-naphthyl) ethylenediamine and then colorimetrically measuring the color development after a predetermined period of time which should coincide with the reaction time of the fluid test.

Although a basic test procedure has now been described, this leaves open a variety of embodiments for the actual measurement. First, the test may be automated if desired, and various machines manufactured commercially are available for automatically measuring colorimetrically the blanks and/or samples after preset periods of time. In addition, the measurement may be made manually. This is, of course, done by simply following the process instructions and then evaluating by various laboratory means the color of the solution after a period of time. Another method of colorimetrically evaluating the samples and blanks is the kinetic method. In the kinetic method a plurality of readings or continual readings are taken as the reaction proceeds and the color develops. As this is done, of course, the color becomes more intense. The plurality of readings can then be used for extrapolating to determine the end point of the reaction.

The reagents used in this process, ortho-phthalaldehyde and N-(1-naphthyl) ethylenediamine dihydrochloride are both very stable at common temperatures. This is, of course, a significant advantage over certain of the prior attempts to measure blood urea directly in that certain of these prior reagents were generally unstable. Additionally, the advantage of not requiring a heating step to about 90° C. is a significant advantage. Many previous attempts have required heating to a range from about 90° to about 100° C., i.e., boiling. This is, of course, both time consuming and costly. This process does not require specific temperatures and, in fact, can be run at any temperature desirable wherein the actual physical state of the reagents or fluid does not change. Additionally, the color development of this invention is complete in approximately 30 minutes. Therefore, the user of this process has the option of measuring colorimetrically his sample either continuously, or in 30 minutes, or intermittently over a 30 minute period or at some predetermined point of time after the addition of N-(1-naphthyl) ethylenediamine dihydrochloride. This test is characterized by a high degree of accuracy and reproducability in addition to exhibiting a linear relationship between absorbance and concentration which allows mathematical computations to be greatly simplified. An additional advantage of this invention is the use of very small sample sizes. The sample sizes may vary from as small as 1 microliter to as much as desired. This is, of course, a significant advantage as the blood samples actually taken and to be tested are often very difficult to obtain.

The following examples illustrate the present invention but are not to be construed as limiting the same.

EXAMPLE 1

An ortho-phthalaldehyde reagent solution was prepared in the following manner:

200 mg. of ortho-phthalaldehyde and 0.75 ml. of 30 percent BRIJ-35 [polyoxyethylene(23) lauryl ether] were dissolved in 1000 ml. of 0.1 N sulfuric acid. 2.5 ml. of the orthophthalaldehyde reagent solution were placed into each of two test tubes. The first test tube was labeled "the blank Unitube" while the second was labeled "the sample Unitube." 50 microliters of blood serum were added to the sample Unitube while none was added to the blank Unitube. A reagent solution of N-(1-naphthyl) ethylenediamine dihydrochloride was prepared in the following manner:

5 g. of boric acid, 600 ml. of water and 222 ml. of concentrated sulfuric acid were mixed. After mixing, the resulting mixture was cooled to about room temperature at which time 600 mg. of N-(1-naphthyl) ethylenediamine dihydrochloride and 0.75 ml. of 30 percent polyoxyethylene(23) lauryl ether were added. To this mixture water was added to make the final volume of the reagent 1 liter. 2.5 ml. of the N-(1-naphthyl) ethylenediamine reagent was then placed into each test tube. The test tubes were then capped, mixed and placed in a 37° C. incubator for 30 minutes. After 30 minutes, they were removed from the incubator and were allowed to stand at room temperature for 10 minutes. At this time, they were placed in a DigiTek spectrophotometric (Bio-Dynamics, Inc. of Indianapolis, Indiana) measuring instrument and the readings were taken at 540 nm. The blank Unitube had an absorbance of 0.120 while the sample Unitube read an absorbance of 0.636. This indicated that the sample had 80 mg. per deciliter of urea. This is an abnormally high sample and would indicate kidney malfunction.

EXAMPLE 2

An ortho-phthalaldehyde reagent solution was prepared by dissolving 400 mg. of ortho-phthalaldehyde and 0.75 ml. of 30 percent polyoxyethylene(23) lauryl ether in 100 ml. of 0.1 N sulfuric acid. 2.0 ml. of the ortho-phthalaldehyde reagent solution were placed into each of two test tubes. The first test tube was labeled "the blank Unitube" while the second test tube was labeled "the sample Unitube". 97.5 ml. of a blood serum sample was then added to the sample Unitube whereas no blood serum was added to the blank Unitube. At this time, a reagent solution of N-(1-naphthyl) ethylene-diamine dihydrochloride was prepared in exactly the same manner as it was prepared in Example 1 and 2.0 ml. of the reagent mixture was placed in each unitube. The tubes were then incubated at 37° C. for 5 minutes. At this time, one drop of a 1 percent mercaptan was added and mixed and were allowed to stand at room temperature for 5 minutes. The Unitubes were then colorimetrically measured in the Digi-Tek instrument at 540 nm. The results indicated a reagent blank absorbance of 0.017 and the test absorbance of 0.300. This indicated a blood urea level of 40 mg. per deciliter of blood. This is an elevated urea content which indicated kidney malfunction.

EXAMPLE 3

A series of six ortho-phthalaldehyde reagent solutions were prepared. These were prepared by using 100, 200, 300, 400, 500 and 600 mg. of ortho-phthalaldehyde and 0.75 ml. of 30 percent polyoxyethylene(23) lauryl ether in about 1000 ml. of 0.1 N sulfuric acid. Therefore, six separate experiments were run, one for each of the above reagent solution concentrations of ortho-phthalaldehyde. Each of the six separate experiments was run in the following manner. 1 ml. of ortho-phthalaldehyde reagent solution was added to a test tube. 20 microliters of a blood serum sample was then added to that same test tube. The same blood serum sample was used in all six experiments. The test tube which now contained the orthophthalaldehyde reagent solution and blood serum sample was incubated at 37° C. for five minutes. At this time, 1 ml. of N-(1-naphthyl) ethylenediamine dihydrochloride reagent solution prepared exactly as it was prepared in Example 1 was added. The resulting solution was then transferred to a cuvette. The cuvette was placed in a heated (37° C.) optical module of a Coleman 124 Spectrophotometer. The reaction was then followed continuously at 540 nm. wavelength for five minutes using a Hewlett-Packard recorder. Absorbance at two minutes was subtracted from absorbance at five minutes. This reading was divided by three giving the change in absorbance per minute. A change in absorbance per minute of 0.015 was found which indicated a blood urea level of 50 mg. per deciliter in the sample. This was an elevated level and indicated kidney malfunction. The above procedure was repeated using ortho-phthalaldehyde reagent concentrations with 200, 300, 400, 500 and 600 mg. per liter. The results and degree of change per minute were:

200 mg. = .030
300 mg. = .043
400 mg. = .060
500 mg. = .063
600 mg. = .072

Again, all of these concentrations indicated an elevated urea level and indicated kidney malfunction.

EXAMPLE 4

An ortho-phthalaldehyde reagent solution was prepared exactly as it was prepared in Example 3 using 200 mg. of ortho-phthalaldehyde. 0.5 ml. of the ortho-phthalaldehyde reagent solution was added to each of three cuvettes. To the first cuvette was added 0.1 ml of water; to the second cuvette was added 10 microliters of 15 mg. per deciliter urea standard and 90 microliters of water; and to the third cuvette 10 microliters of unknown sample and 90 microliters of water were added. To each of the three cuvettes .5 ml. of N-(1-naphthyl) ethylenediamine dihydrochloride reagent solution was added (said reagent being prepared exactly as it was in Example 3). The three cuvettes were then incubated at 37° C. for 10 minutes. The absorbance readings were then taken at 540 nm. on a fast analyzer. An absorbance of 0.000 was obtained for cuvette number 1. An absorbance of 0.119 was obtained for cuvette number 2. Finally, an absorbance of 0.294 was obtained for cuvette number 3. These levels of absorbance indicated a blood urea level of 41 mg. per deciliter in the unknown sample. This was an elevated level and indicated kidney malfunction.

EXAMPLE 5

An ortho-phthalaldehyde reagent solution was prepared in exactly the same manner as it was prepared in Example 4 with the exception that 600 mg. of ortho-phthalaldehyde was used in preparing the solution. 0.05 ml. per minute of blood serum sample, 0.60 ml. per minute saline (0.9 g. NaCl/dl.), and 0.32 ml. per minute of air were then pumped into a dialyzer. 0.6 ml.

per minute of water and 0.32 ml. per minute of air were pumped into said dialyzer. The dialyzer was temperature controlled at 37° C. 0.23 ml. per minute of the above ortho-phthalaldehyde solution (600 mg. orthophthalaldehyde) and 0.8 ml. per minute of N-(1-naphthyl) ethylenediamine dihydrochloride (prepared exactly as it was in Example 4) were pumped into the system which was temperature controlled at 37° C. The dialyzed sample and reagent mixture at 37° C. moved through a 28 turn coil and a 14 turn coil and into a flow cell. Percent transmittance readings were taken at 505 nm. and recorded on a chart recorder. A percent transmittance of 87.5 was obtained for the sample. The results indicated this sample had a blood urea value of 10 mg./dl. which is a normal value.

EXAMPLE 6

The same procedures as above in examples 2 through 5 are repeated exactly with the exception that the temperature is not controlled at 37° C. Results are equivalent to those obtained at 37° C. and indicate that temperature is not critical with the single exception that the time of reaction is affected.

EXAMPLE 7

The procedure of Example 2 is repeated exactly with the single exception that urine is used in place of blood serum. Results correlate with those obtained by use of the colorimetric method described in the *Manual of Clinical Laboratory Methods*, fourth edition, by Opal Heffler, publisher, Charles Thomas, Springfield, Ill. The Heffler method comprises hydrolyzing urea to ammonia carbonate by means of the enzyme urease in the presence of a buffer solution. Ammonia is liberated from the carbonate salt by the addition of sodium hydroxide and then distilled into 0.05 normal hydrochloric acid. The amount of nitrogen present is then determined colorimetrically.

What is claimed is:

1. A process for determining the urea content of fluids comprising:
   a. mixing:
      1. ortho-phthalaldehyde;
      2. a fluid sample;
      3. N-(1-naphthyl) ethylenediamine dihydrochloride; and
   b. obtaining a colorimetric reading after a period of time for the resulting mixture.

2. The process of claim 1 wherein the orthophthalaldehyde, fluid sample and N-(1-naphthyl) ethylenediamine dihydrochloride are mixed and then heated to approximately 37° C. prior to obtaining a colorimetric reading.

3. The process of claim 1 wherein the orthophthalaldehyde and fluid sample are mixed first and then heated to approximately 37° C. prior to the addition of N-(1-naphthyl) ethylenediamine dihydrochloride.

4. The process of claim 1 wherein said colorimetric reading is compared to a blank sample, said blank sample comprising a combination of ortho-phthalaldehyde and N-(1-naphthyl) ethylenediamine dihydrochloride.

5. The process of claim 1 wherein said period of time is less than about 30 minutes.

6. The process of claim 1 wherein said ortho-phthalaldehyde is present in a solution which is prepared by dissolving from about 100 mg. to about 700 mg. of ortho-phthalaldehyde and about ¾ ml. of 30 percent polyoxyethylene(23) lauryl ether in about 1000 ml. of 0.1 N sulfuric acid.

7. The process of claim 1 wherein said N-(1-naphthyl) ethylenediamine dihydrochloride is present in a solution prepared by mixing the following in a ratio as set forth below:
   a. about 5 g. of boric acid;
   b. about 600 ml. of water;
   c. about 220 ml. of concentrated sulfuric acid;
   d. from about 100 mg. to about 700 mg. of N-(1-naphthyl) ethylenediamine dihydrochloride;
   e. about ¾ ml. of 30 percent polyoxyethylene(23) lauryl ether; and
   f. adding water to make the final volume about 1 liter.

8. The process of claim 1 wherein said period of time is about 10 minutes.

9. The process of claim 1 wherein a plurality of colorimetric readings are obtained prior to the endpoint of the reaction whereby the endpoint of the reaction can be predicted.

10. The process of claim 1 wherein said fluid is blood serum.

11. A process for determining the urea content of fluids comprising:
   a. adding equal portions of ortho-phthalaldehyde to a sample container and a blank container;
   b. adding a fluid sample to said sample container;
   c. adding equal portions of N-(1-naphthyl) ethylenediamine dihydrochloride to said sample container and said blank container;
   d. heating said sample container and contents and said blank container and contents to approximately 37° C;
   e. permitting said reaction to occur at an elevated temperature for a predetermined period of time;
   f. obtaining a first colorimetric reading for said sample container and a second colorimetric reading for said blank container; and
   g. whereby the difference between the colorimetric reading for said sample container and said blank container indicates the level of urea in blood serum.

12. The process of claim 11 wherein said period of time is less than about 30 minutes.

13. The process of claim 11 wherein said orthophthalaldehyde is present in a solution which is prepared by dissolving from about 100 mg. to about 700 mg. of orthophthalaldehyde and about ¾ ml. of 30 percent polyoxyethylene(23) lauryl ether in about 1000 ml. of 0.1 N sulfuric acid.

14. The process of claim 11 wherein said N-(1-naphthyl) ethylenediamine dihydrochloride is present in a solution prepared by mixing the following in a ratio as set forth below:
   a. about 5 g. of boric acid;
   b. about 600 ml. of water;
   c. about 220 ml. of concentrated sulfuric acid;
   d. from about 100 mg. to about 700 mg. of N-(1-naphthyl) ethylenediamine dihydrochloride;
   e. about ¾ ml. of 30 percent polyoxyethylene(23) lauryl ether; and
   f. adding water to make the final volume about 1 liter.

15. The process of claim 11 wherein said predetermined time is about 10 minutes.

16. The process of claim 11 wherein a plurality of colorimetric readings are obtained prior to the endpoint of the reaction whereby the endpoint of the reaction can be predicted.

17. The process of claim 11 wherein said fluid is blood serum.

* * * * *